United States Patent [19]

Icking et al.

[11] Patent Number: 4,485,830

[45] Date of Patent: Dec. 4, 1984

[54] CLEANSING ARRANGEMENT FOR A MILKING MACHINE

[75] Inventors: Friedrich Icking, Oelde; Heinrich Bücker, Langenberg, both of Fed. Rep. of Germany

[73] Assignee: Westfalia Separator AG, Oelde, Fed. Rep. of Germany

[21] Appl. No.: 299,212

[22] Filed: Sep. 3, 1981

[30] Foreign Application Priority Data

Sep. 9, 1980 [DE] Fed. Rep. of Germany ....... 3033816

[51] Int. Cl.$^3$ .............................................. B08B 9/06
[52] U.S. Cl. .................... 134/100; 134/171; 222/144.5
[58] Field of Search ................. 134/99, 100, 101, 171, 134/94–98; 222/144.5

[56] References Cited

U.S. PATENT DOCUMENTS

| | | | |
|---|---|---|---|
| 2,118,704 | 5/1938 | Grontkowski | 222/144.5 |
| 2,320,048 | 5/1943 | Parson | 222/144.5 |
| 2,558,628 | 6/1951 | Redin | 134/98 |
| 2,714,893 | 8/1955 | Zimmer | 134/100 X |
| 3,119,399 | 1/1964 | Bender | 134/101 X |
| 3,119,400 | 1/1964 | Bihler | 134/101 X |
| 3,589,378 | 6/1971 | Swanson et al. | 134/100 X |
| 3,618,621 | 11/1971 | Nordegren | 134/171 X |
| 3,916,923 | 11/1975 | Branton | 134/99 X |
| 3,921,652 | 11/1975 | Schmid | 134/100 X |

FOREIGN PATENT DOCUMENTS 1,545,342  5/1979  United Kingdom ............... 134/100

*Primary Examiner*—Stephen Marcus
*Attorney, Agent, or Firm*—Kontler, Grimes & Battersby

[57] ABSTRACT

A cleansing arrangement for a milking machine has a reservoir for cleansing fluid. A vacuum line for conveying the cleansing fluid through the milking machine has an inlet end at the bottom of the reservoir and an outlet end at the top of the reservoir. A metering device for measuring predetermined amounts of concentrated cleansing fluid is located inside the reservoir. A pipe connects the metering with the vacuum line. The pipe has a branch which leads to a supply of water to serve as a diluent for the concentrated cleansing fluid. The metering device is further connected with two sources of different concentrated cleansing fluids via two separate pipes. Each pipe has its own valve member which normally closes the respective pipe. A handle is provided for selectively opening the cleansing fluid supply pipes. In operation, the handle is moved to open one of the cleansing fluid supply pipes. A measured amount of cleansing fluid is drawn into the reservoir via the metering device by means of suction created by the vacuum line. Subsequently, water is admitted into the reservoir to dilute the cleansing fluid and additional water is admitted directly into the vacuum line. The diluted cleansing fluid from the reservoir is drawn into the vacuum line and, after mixing with the water admitted directly into the vacuum line, is conveyed through the milking machine to cleanse the same. The diluted cleansing fluid is then returned to the reservoir where it may be temporarily stored for further use.

31 Claims, 5 Drawing Figures

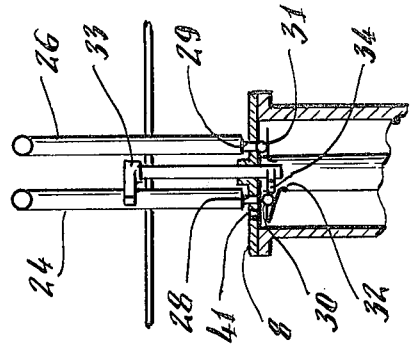
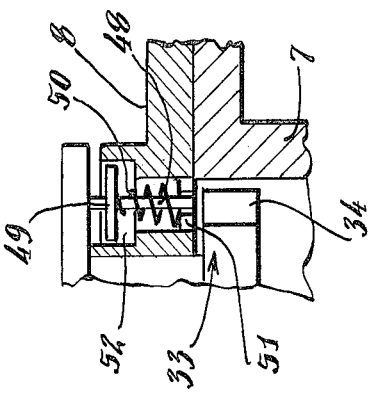
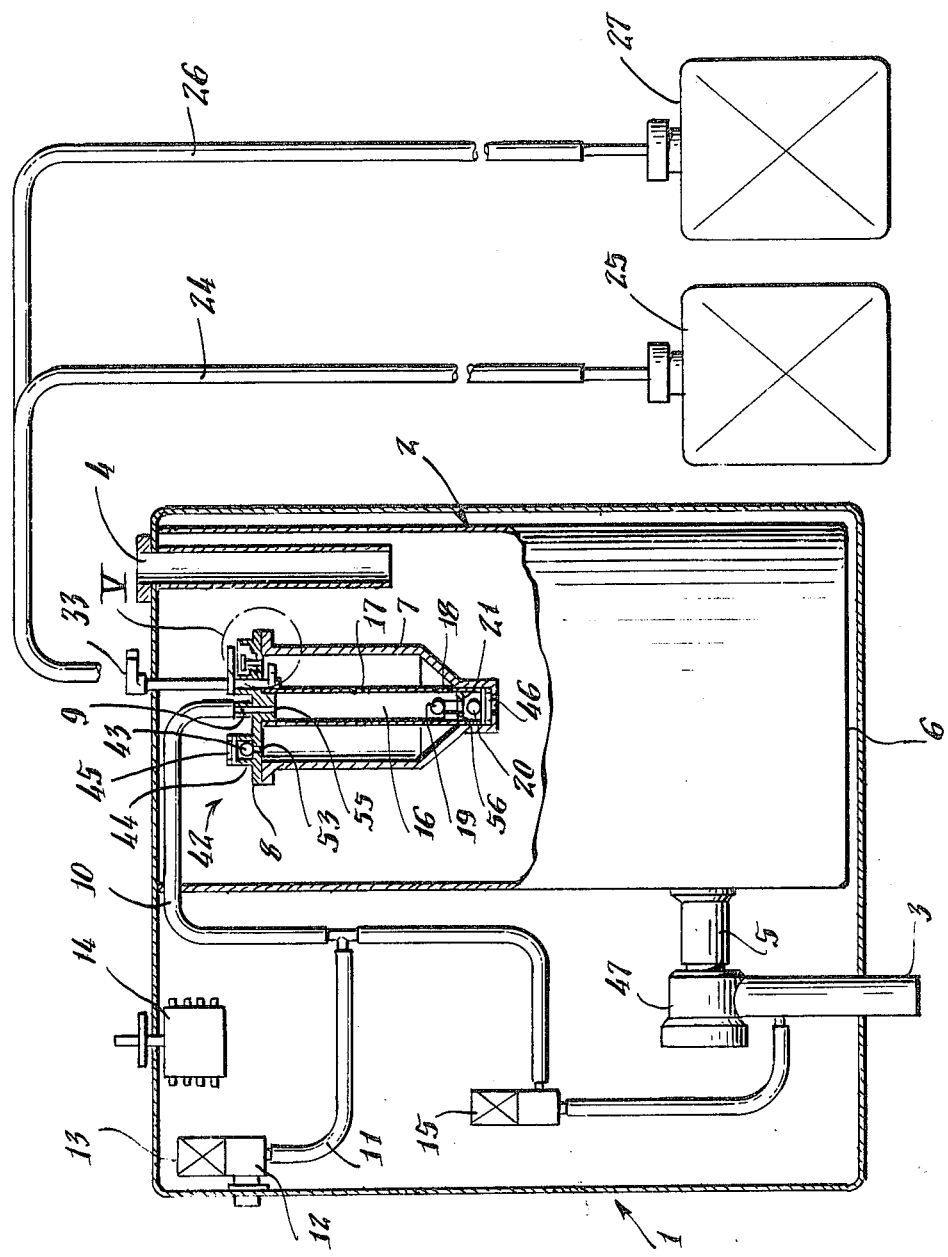

CLEANSING ARRANGEMENT FOR A MILKING MACHINE

BACKGROUND OF THE INVENTION

The invention relates generally to milking plants. More particularly, the invention relates to cleansing arrangements for milking machines.

Milking machines have pipes through which milk from the cows flows to receptacles. These pipes and receptacles must be cleansed periodically.

A known cleansing arrangement for milking machines has a storage vessel for a concentrated cleansing fluid. The storage vessel is connected to a metering device via a cleansing fluid supply pipe. The metering device is located at the upper end of a reservoir for the cleansing fluid and has an outflow opening at its lower end to permit the cleansing fluid to flow into the reservoir. The outflow opening is regulated by a vacuum-actuated valve member which causes the outflow opening to be closed in response to the creation of a vacuum in the metering device. The metering device has a throttling opening which communicates with the atmosphere or with the interior of the reservoir and causes the vacuum within the metering device to be destroyed when suction is no longer applied to the metering device.

A vacuum line which directs the cleansing fluid through the pipes and receptacles of the milking machine communicates with the reservoir. The vacuum line has an inlet end which is connected with the lower end of the reservoir and an outlet end which is connected with the upper end of the reservoir. A vacuum is created in the vacuum line whenever the milking machine is to be cleansed.

A source of water for diluting the cleansing fluid is connected with the metering device by means of a water supply pipe. The water supply pipe has a branch which connects with the vacuum line near the inlet end of the latter thereby establishing communication between the vacuum line and the metering device. This makes it possible to generate a vacuum in the metering device and thus draw cleansing fluid from the cleansing fluid storage vessel into the metering device by suction. The water supply pipe has an outlet opening at the upper end of the metering device and a floating valve member inside the metering device causes this outlet opening to be closed when the cleansing fluid in the metering device reaches a predetermined level. This causes the suction in the metering device to be terminated and stops the flow of cleansing fluid into the metering device. A valve is provided in the water supply pipe to isolate the metering device from the vacuum line.

A cleansing arrangement of the type outlined above is known from German Auslegeschrift No. 26 08 585. Here, the metering device has a cover which is provided with a connection for the cleansing fluid supply pipe. In order to satisfactorily cleanse the vacuum line and the parts of the milking machine connected therewith, the cleansing procedure is performed with an acidic cleansing fluid or an alkaline cleansing fluid. When a switch in the cleansing fluid is to be made, the connection on the cover of the metering device must be connected with a different supply pipe leading to a source of the new cleansing fluid. Since residues of the previous cleansing fluid remain in the connection, crystalline deposits are formed when the new cleansing fluid, which has a different consistency and chemical composition than the previous cleansing fluid, is sucked into the connection. These deposits reduce the flow cross-section of the connection and may even constrict the same entirely, especially since the connection extends upwards from the cover of the metering device and cannot be reached by water which is admitted into the metering device for cleansing of the same.

OBJECTS AND SUMMARY OF THE INVENTION

It is an object of the invention to provide a cleansing arrangement for milking machines which makes it possible to use different types of cleansing fluids with little or no formation of deposits.

Another object of the invention is to provide a cleansing arrangement of the type described above which makes it possible to convey both acidic and alkaline cleansing fluids into the metering device with little or no danger of the formation of crystalline deposits in the region where the cleansing fluids enter the metering device.

These objects, and other which will become apparent as the description proceeds, are achieved by the invention.

The invention provides a cleansing arrangement for a milking machine which comprises two sources of cleansing fluid and connecting means establishing communication between these sources and the milking machine. The connecting means includes a metering device for measuring predetermined amounts of the cleansing fluids and a pair of conduits which respectively connect the two sources with the metering device. Valve means is provided for the conduits and includes a valve member for each conduit which is movable between an open position for the respective conduit and a closed position for the respective conduit.

Since the connection between each conduit and the metering device is contacted exclusively by one type of fluid, the formation of crystalline deposits in the connection is eliminated or substantially reduced.

The cleansing fluid sources may respectively accommodate an acidic cleansing fluid and an alkaline cleansing fluid.

It is preferred for the conduits to open into the upper region of the metering device.

According to one embodiment of the invention, an actuating member is provided which can selectively move either of the valve members into its open position independently of the other valve member.

In an advantageous embodiment of the invention, the metering device has a cover which is provided with connecting portions for the conduits. The valve members for the conduits are located on the inside of the cover and are in the form of spring-loaded spheres. An actuating member is provided for the valve members and includes a nose located inside the cover and a shaft which extends through the cover to the exterior of the metering device so as to be accessible from outside the latter. An annular spring is mounted on the inside of the cover and has a pair of legs which terminate on either side of the nose of the actuating member and respectively urge the valve members into their closed positions. The actuating member is rotatable and the nose may be selectively moved over either leg of the spring to displace the leg from the respective valve member and permit the respective valve member to drop to its open position.

The novel features which are considered as characteristics of the invention are set forth in particular in the appended claims. The improved cleansing arrangement itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a partly cross-sectional view of a cleansing arrangement for milking machines in accordance with the invention;

FIG. 4 is a vertical cross-section through the upper part of the metering device of the cleansing arrangement of FIG. 1; and FIG. 5 is an enlarged view of the area V in FIG. 1.

DESCRIPTION OF THE PREFERRED EMBODIMENTS

Figure 2:
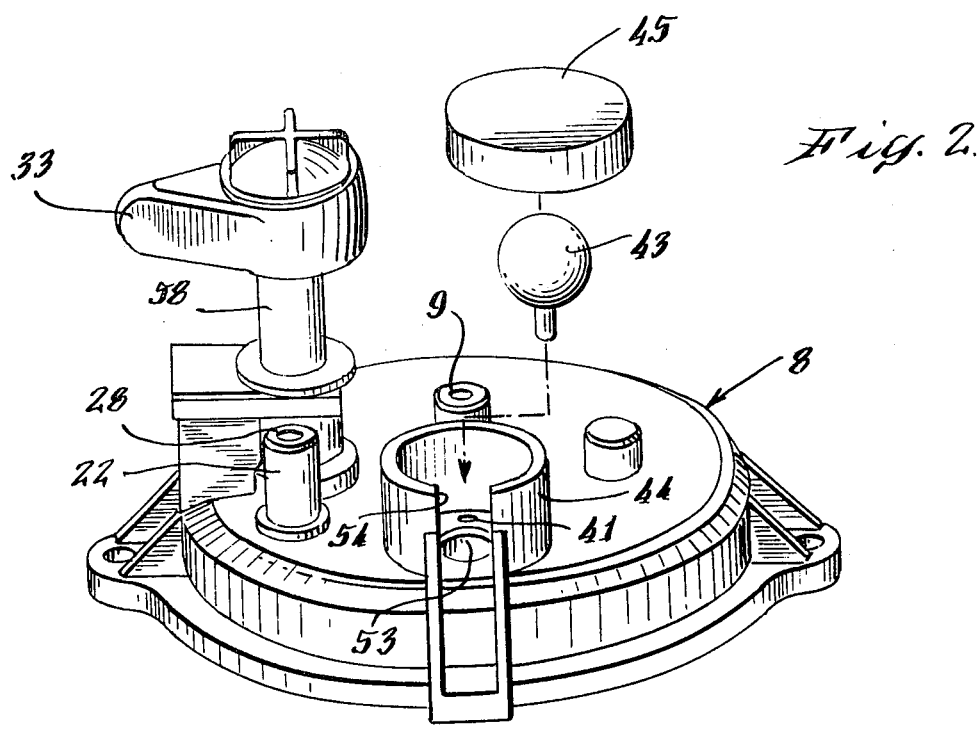
FIG. 2 is a perspective view of a cover for the metering device of the cleansing arrangement of FIG. 1 as seen from above.

Referring to FIG. 1, the reference numeral 1 identifies a cleansing arrangement for milking machines according to the invention. The cleansing machine 1 has a reservoir 2 which is connected with a vacuum line 3. The vacuum line 3 has an inlet end 5 in the lower portion of the reservoir 2 and an outlet end 4 in the upper portion of the reservoir 2. The inlet end 5 of the vacuum line 3 is spaced from the bottom 6 of the reservoir 2. The vacuum line 3 communicates with those pipes of a non-illustrated milking machine through which milk from the cows flows to receptacles. A solenoid valve 47 is arranged in the vacuum line 3 adjacent to the inlet end 5 thereof.

A metering device 7 having a cover 8 is mounted in the upper portion of the reservoir 2. The metering device 7 and its cover 8 are located entirely inside the reservoir 2. The cover 8 is provided with a nipple 9 having a flow passage 55 which opens to the interior of the metering device 7. The nipple 9 is connected with a water supply pipe 10 which communicates with the vacuum line 3 in the region of the inlet end 5 thereof. The water supply pipe 10 has a branch 11 which leads to a junction 12 connected with a suitable water supply. The flow of water into the water supply pipe 10 is regulated by a solenoid valve 13 located at the junction 12.

A solenoid valve 15 in the water supply pipe 10 serves to isolate the interior of the metering device 7 from the vacuum line 3 when closed. The solenoid valve 15 is located between the vacuum line 3 and the branch 11 of the water supply pipe 10.

A programmable switching device 14 mounted in the cleansing arrangement 1 controls the solenoid valves 13, 15 and 47.

A tubular insert 16 is centrally located in the metering device 7 and extends for the entire height of the latter. The flow passage 55 of the central nipple 9 opens into the interior of the tubular insert 16. The tubular insert 16 is provided with a lateral opening 17 in the central region thereof which established communication between the interior of the metering device 7 and that of the tubular insert 16. Lateral openings 18 similar to the opening 17 are also provided inthe lower region of the tubular insert 16.

The tubular insert 16 has a transverse wall 56 below the lateral openings 18 and above the lower end of the metering device 7. The transverse wall 56 is provided with an outflow opening 21 which communicates with an outlet 46 in the bottom of the metering device 7 leading to the interior of the reservoir 2.

A floating valve member 19 is located internally of the tubular insert 16. When fluid is admitted into the metering device 7, the floating valve member 19 rises as the fluid level in the metering device 7 rises. When the fluid in the metering device 7 reaches a predetermined level, the floating valve member 19 seals the flow passage 55 in the nipple 9.

A vacuum-actuated valve member 20 is located between the transverse wall 56 of the tubular insert 16 and the lower end of the metering device 7. When a vacuum is generated inside the metering device 7, the vacuum-actuated valve mamber 20 is pulled upwards and seals the outflow opening 21.

Figure 3:
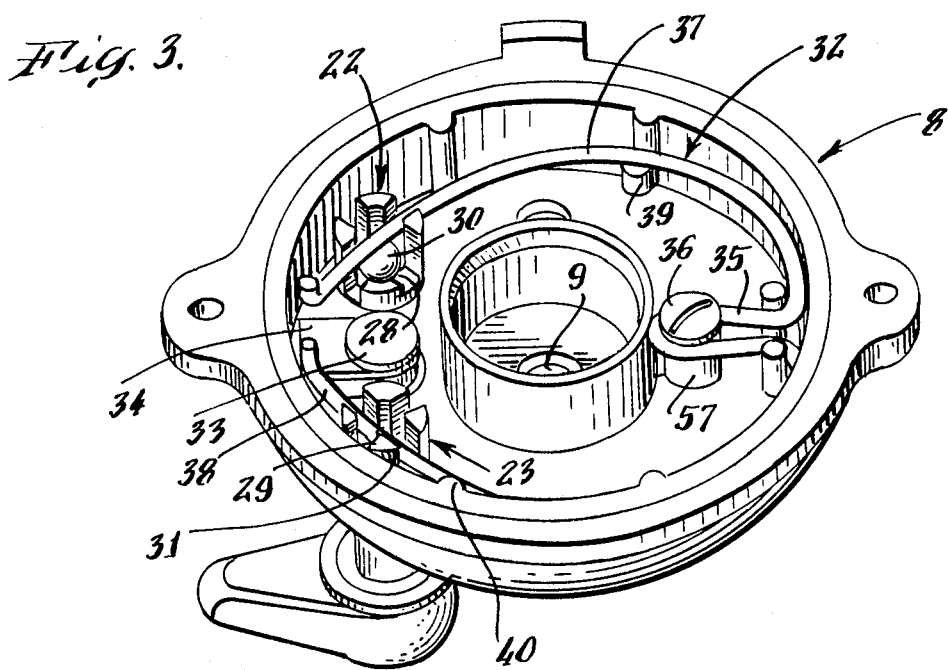
FIG. 3 is a perspective view of the cover of FIG. 2 as seen from below.

As seen in FIGS. 2, 3 and 4, the cover 8 of the metering device 7 is provided with a pair of connections or connecting portions 22 and 23 which are provided with respective inflow openings 28 and 29 communicating with the interior of the metering device 7. The connection 22 is connected with a suction line or conduit 24 leading to a storage vessel 25 for a concentrated acidic cleansing fluid (FIG. 1). The connection 23 is connected with a suction line or conduit 26 leading to a storage vessel 27 for a concentrated alkaline cleansing fluid (FIG. 1).

As best seen in FIGS. 3 and 4, a pair of spherical valve members 30 and 31 are located adjacent to the respective inflow openings 28 and 29 of the connections 22 and 23. The spherical valve members 30 and 31 are normally held in sealing engagement with the inflow openings 28 and 29 by means of an annular spring 32 mounted on the inside of the cover 8. The spring 32 has a pair of legs 37 and 38 which respectively underlie the spherical valve members 30 and 31 and urge these into engagement with the inflow openings 28 and 29. The legs 37 and 38 terminate short of one another so that a gap exists between the ends of the legs 37 and 38. The spring 32 has a loop 35 which is located diametrically opposite the gap between the ends of the legs 37 and 38. The loop 35 extends inwards of the spring 32 towards the inner part of the cover 8. The loop 35 passes around a screw 57 which is mounted on the cover 8 and has a head or abutment 36. The loop 35 is retained by the head 36 of the screw 57 and the spring 32 is maintained in tension by having the loop 35 located in a different plane than the legs 37 and 38. The legs 37 and 38 rest on bearing members 39 and 40 mounted on the cover 8.

Referring now to FIG. 2 in conjunction with FIGS. 3 and 4, it is seen that a handle or actuating member 33 is rotatably mounted on the cover 8 of the metering device 7 diametrically opposite the loop 35 of the spring 32. The handle 33 is located in the region of the gap between the ends of the legs 37 and 38 of the spring 32 and is situated between the connections 22 and 23 and the respective spherical valve members 30 and 31. The handle 33 has a shaft 58 which extends through the cover 8. The lower end of the handle 33, which is located inside the cover 8, is provided with a nose 34. The ends of the legs 37 and 38 of the spring 32 are located within the range of rotation of the nose 34 and the nose 34 can be selectively rotated over the legs 37 and 38 to displace the same from the spherical valve members 30 and 31. The spherical valve members 30 and 31 can then drop away from and open the respective inflow openings 28 and 29. When the nose 34 is in its central position, which corresponds to the gap between the ends of the legs 37 and 38 of the spring 32, the legs 37 and 38 urge the spherical valve members 30 and 31 into sealing engagement with the inflow openings 28 and 29.

As shown in FIGS. 1 and 2, the cover 8 of the metering device 7 is further provided with a flow channel 53 and a valve arrangement 42 for the flow channel 53. The valve arrangement 42 has a valve element 43 which is accommodated in a housing 44 formed of one piece with the cover 8. The housing 44 is provided with a lateral outlet opening or flow passage 54 and has an open upper end which is closed by a removable cap 45. The cap 45 makes it possible to gain access to the interior of the housing 44.

As illustrated in FIGS. 2 and 4, the cover 8 of the metering device 7 is also provided with a throttling opening 41 which, in the illustrated embodiment, establishes communication between the interior of the metering device 7 and that of the reservoir 2. However, it is possible for the throttling opening 41 to communicate with the atmosphere rather than the interior of the reservoir 2. Although the throttling opening 41 may be provided at any location of the cover 8, it is advantageous for the throttling opening 41 to be located in that part of the cover 8 which constitutes the bottom of the housing 44. The reason is that the housing 44 and cap 45 then protect the throttling opening 41 from contamination.

As mentioned previously, the metering device 7 and its cover 8 are located entirely within the reservoir 2. This feature, in combination with the flow channel 53 and valve arrangement 42 provided in the cover 8, makes it possible to intensively rinse the metering device 7 with water. Thus, since water can flow out of the metering device 7 via both the bottom and top thereof, the water can circulate thoroughly throughout the metering device 7 and all of the water can be discharged into the reservoir 2.

In operation, a vacuum is created in the vacuum line 3 by non-illustrated suction means when the milking machine is to be cleansed and is maintained during the entire cleansing procedure. A measured amount of a cleansing fluid is then withdrawn from one of the storage vessels 25 and 27. Assuming that the cleansing procedure is to be performed with the acidic cleansing fluid, this is achieved by turning the handle 33 so that the nose 34 thereof moves above the leg 37 of the spring 32 thereby displacing the leg 37 from the spherical valve member 30. The spherical valve member 30 then drops away from the inlet opening 28 of the connection 22 which is connected with the suction line 24 leading to the storage vessel 25 for the acidic cleansing fluid. This establishes communication between the storage vessel 25 and the interior of the metering device 7. The programmable switching device 14 opens the solenoid valve 15 so that the suction in the vacuum line 3 causes the interior of the metering device 7 to be evacuated. The vacuum thus created in the metering device 7 causes the vacuum-actuated valve member 20 to move upward and close the outflow opening 21 in the transverse wall 56 of the tubular insert 16. Furthermore, the vacuum created in the metering device 7 causes the acidic cleansing fluid in the storage vessel 25 to flow through the suction line 24 into the metering device 7. The acidic cleansing fluid enters the tubular insert 16 via the lateral openings 18 located in the region of the transverse wall 56. This causes the floating valve member 19 in the tubular insert 16 to rise. The fluid levels inside and outside the tubular insert 16 remain the same until these reach the lateral opening 17 of the tubular insert 16. At this stage, only the level of the fluid inside the tubular insert 16 continues to rise. This continues until the floating valve member 19 closes the flow passage 55 in the nipple 9. When this occurs, the interior of the metering device 7 is no longer exposed to the suction in the vacuum line 3.

Air flows into the upper portion of the metering device 7 through the throttling opening 41 thereby destroying the vacuum in the metering device 7 and causing the flow of acidic rinsing fluid into the metering device 7 to cease. The destruction of the vacuum in the metering device 7 also causes the vacuum-actuated valve member 20 to drop away from the outflow opening 21 in the transverse wall 56 of the tubular insert 16. As a result, the acidic cleansing fluid flows into the reservoir 2 via the outflow opening 21 and the outlet 46 in the bottom of the metering device 7.

The programmable switching device 14 now opens the solenoid valve 13. This causes water to flow into the water supply pipe 10 via the junction 12 and the branch 11 of the water supply pipe 10. The water serves to dilute the acidic cleansing fluid obtained from the storage vessel 25. Part of the water from the branch 11 flows upwards through the water supply pipe 10 into the metering device 7 and, from the latter, into the reservoir 2 via the outflow opening 21 in the transverse wall 56 of the tubular insert 16 and the outlet 46 in the bottom of the metering device 7. The remainder of the water flows downwards through the water supply pipe 10 directly into the vacuum line 3.

The programmable switching device 14 opens the solenoid valve 47 thereby causing the diluted acidic cleansing fluid in the reservoir 2 to flow into the vacuum line 3 via the inlet end 5 thereof. The diluted acidic cleansing fluid in the vacuum line 3 is conveyed through the various pipes and receptacles of the milking machine thereby cleansing the same. After leaving the milking machine, the diluted acidic cleansing fluid is returned to the reservoir 2 via the outlet end 4 of the vacuum line 3. The diluted acidic cleansing fluid can be temporarily stored in the reservoir 2 and again circulated through the milking machine.

After the required amount of acidic cleansing fluid has been admitted into the metering device 7 from the storage vessel 25, the handle 33 is rotated so that the nose 34 is in its central position. This causes the leg 37 of the spring 32 to press the spherical valve member 30 back into sealing engagement with the inlet opening 28 of the connection 22 thereby sealing the same.

If an alkaline cleansing fluid is to be used for the cleansing procedure, the nose 34 of the handle 33 is simply rotated towards the leg 38 of the spring 32. This causes the leg 38 to be displaced from the spherical valve member 31. The spherical valve member 31 drops away from the inlet opening 29 of the connection 23 thereby establishing communication between the interior of the metering device 7 and the storage vessel 27 for the alkaline cleansing fluid via the suction line 26. The remainder of the cleansing procedure is performed in the same manner as described earlier for the acidic cleansing fluid.

An arresting arrangement is provided to prevent rotation of the handle 33 and its nose 34 from one position to another during evacuation of the metering device 7. This arresting arrangement, which is shown in FIG. 5, includes an arresting pin or member 48 which is mounted for vertical movement in the cover 8 of the metering device 7. In the illustrated embodiment, the arresting pin 48 is formed of one piece with a disk 49. A spring 50 is arranged between the disk 49 and the cover 8. One end of the spring 50 bears against the disk 49 while the other end of the spring 50 bears against abutment members 51 formed on the cover 8. The disk 49 is arranged within an annular chamber 52 in which it can undergo limited movement in a vertical direction. The arresting pin 48 and disk 49 are in communication with the interior of the metering device. When the nose 34 of the handle 33 is rotated towards one of the legs 37 or 38 of the spring 32 and a vacuum is created in the metering device 7, the arresting pin 48 is drawn into the metering device 7 against the resistance of the spring 50 by the vacuum. The pin 48 is then located next to the nose 34 and prevents the latter from moving. When the vacuum in the metering device 7 is destroyed, the arresting pin 48 is moved back to its starting position by the spring 50.

Without further analysis, the foregoing will so fully reveal the gist of the present invention that others can, by applying current knowledge, readily adapt it for various applications without omitting features that, from the standpoint of prior art, fairly constitute the essential characteristics of the generic and specific aspects of our contribution to the art and, therefore, such adaptations should and are intended to be comprehended within the meaning and range of equivalence of the appended claims.

We claim:

1. A cleansing arrangement for a milking machine comprising:
   (a) a first source of a first cleansing fluid;
   (b) a second source of a second cleansing fluid;
   (c) connecting means establishing communication between said first and second sources and the milking machine, said connecting means including a metering device for measuring predetermined amounts of said fluids, and said connecting means further including first and second conduits respectively connecting said first and second sources with and having respective first and second outlet openings at said metering device; and
   (d) valve means for said first and second conduits, said valve means including a first valve member movable between an open position for said first conduit and a closed position for said first conduit, and said valve means further including a second valve member movable between an open position for said second conduit and a closed position for said second conduit, said valve means also including an actuating member for said valve members movable between a rest position in which said valve members are in said closed positions and first and second opening positions in which said first and second valve members respectively are in said open positions, and said valve means additionally including a generally annular spring normally biasing said valve members into the respective closed positions, said spring having a pair of legs which respectively underlie said first and second valve members and terminate on either side of said actuating member, and said actuating member including a rotatable nose for selectively moving the respective legs of said spring away from said first and second valve members to thereby permit movement of the latter to the respective open positions.

2. The arrangement of claim 1, said metering device including a cover having first and second connecting portions for said first and second conduits, respectively; and wherein said valve members are located adjacent to the inner side of said cover and said spring is fixedly mounted on said inner side.

3. The arrangement of claim 2, comprising a tensioning member on said inner side of said cover having an abutment; and wherein said spring has a loop extending inwardly from the periphery thereof and embracing said tensioning member, said loop bearing against said abutment to thereby tension said spring.

4. The arrangement of claim 3, wherein said loop is located diametrically opposite said actuating member.

5. The arrangement of claim 4, comprising a pair of bearing members on said inner side of said cover; and wherein said loop is located outside of the plane of said legs and is arranged such that said legs engage respective ones of said bearing members.

6. A cleansing arrangement for a milking machine comprising:
   (a) a first source of a first cleansing fluid;
   (b) a second source of a second cleansing fluid;
   (c) connecting means establishing communication between said first and second sources and the milking machine, said connecting means including a metering device for measuring predetermined amounts of said fluids, and said connecting means further including first and second conduits respectively connecting said first and second sources with and having respective first and second outlet openings at said metering device;
   (d) valve means for said first and second conduits, said valve means including a first valve member movable between an open position for said first conduit and a closed position for said first conduit, and said valve means further including a second valve member movable between an open position for said second conduit and a closed position for said second conduit, said valve means also including an actuating member for said valve members movable between a rest position in which said valve members are in said closed positions and first and second openings in which said first and second valve members are in said open positions, respectively; and
   (e) an arresting member having an inoperative position and an operative position in which said arresting member arrests said actuating member in said opening positions thereof.

7. The arrangement of claim 6, wherein said conduits open into an upper portion of said metering device.

8. The arrangement of claim 6, wherein said connecting means comprises a reservoir for said fluids.

9. The arrangement of claim 8, wherein said metering device is at least partly accommodated in said reservoir and is arranged in the region of an upper portion of the latter.

10. The arrangement of claim 6, comprising urging means normally urging said arresting member into said inoperative position; and wherein said connecting means comprises a valved vacuum line and said arresting member is arranged to move from said inoperative to said operative position in response to a vacuum generated in said metering device by said vacuum line, said urging means moving said arresting member from said operative to said inoperative position upon destruction of the vacuum.

11. The arrangement of claim 10, wherein said urging means comprises a spring.

12. The arrangement of claim 6, said metering device including a cover having first and second connecting portions for said first and second conduits, respectively; and wherein said arresting member is mounted on said cover for vertical movement between said operative and inoperative positions.

13. The arrangement of claim 6, comprising a source of a diluent for said fluids, and pipe means connecting said diluent source with said connecting means.

14. The arrangement of claim 13, wherein said diluent comprises water.

15. The arrangement of claim 13, said connecting means comprising a reservoir for said fluids, and a valved vacuum line having an inlet end which communicates with said reservoir; and wherein said pipe means has a first outlet end portion communicating with said metering device and a second outlet end portion communicating with said vacuum line in the region of said inlet end thereof, said pipe means being valved to selectively isolate said metering device from said vacuum line.

16. The arrangement of claim 15, wherein said inlet end of said vacuum line is arranged in the region of a lower portion of said reservoir.

17. The arrangement of claim 15, wherein said vacuum line has an outlet end communicating with said reservoir.

18. The arrangement of claim 15, said first outlet end portion of said pipe means opening into an upper portion of said metering device; and wherein a floating valve member is accommodated in said metering device for sealing said first outlet end portion when predetermined amounts of said cleansing fluids have been admitted into said metering device.

19. The arrangement of claim 15, wherein said metering device is provided with a throttling opening communicating with the interior of said reservoir.

20. A cleansing arrangement for a milking machine comprising:
  (a) a first source of a first cleansing fluid;
  (b) a second source of a second cleansing fluid;
  (c) a source of a diluent for said fluids;
  (d) connecting means establishing communication between said first and second sources and the milking machine, said connecting means including a reservoir for said fluids, and a metering device for measuring predetermined amounts of said fluids entirely accommodated in said reservoir, said connecting means further including first and second conduits respectively connecting said first and second sources with said metering device;
  (e) pipe means connecting said diluent source with said metering device, said metering device having a cover provided with a valve arrangement for flow of said diluent from said metering device into said reservoir; and
  (f) valve means for said first and second conduits, said valve means including a first valve member movable between an open position for said first conduit and a closed position for said first conduit, and said valve means further including a second valve member movable between an open position for said second conduit and a closed position for said second conduit.

21. The arrangement of claim 20, wherein said connecting means comprises a vacuum line.

22. The arrangement of claim 21, wherein said metering device has an outflow opening in a lower portion thereof and accommodates a vacuum-actuated valve member for sealing said outflow opening in response to a vacuum generated by said vacuum line.

23. The arrangement of claim 20, wherein said metering device is provided with a throttling opening communicating with the atmosphere.

24. The arrangement of claim 20, wherein said valve members are spherical.

25. The arrangement of claim 20, wherein said valve means includes an actuating member for said valve members, said actuating member being movable between a rest position in which said valve members are in said closed positions and first and second opening positions in which said first and second valve members are in said open positions, respectively.

26. The arrangement of claim 25, said metering device comprising a cover having first and second connecting portions for said first and second conduits, respectively; and wherein said valve members are located interiorly of said metering device and said actuating member extends through said cover so as to be accessible from the exterior of said metering device.

27. The arrangement of claim 25, wherein said valve means comprises biasing means normally biasing said valve members into the respective closed positions.

28. The arrangement of claim 20, said cover having a flow channel for flow of said diluent from the interior of said metering device to the interior of said reservoir; and wherein said valve arrangement comprises a valve element for closing said channel and a housing for said valve element, said housing having a flow passage communicating with said interior of said reservoir.

29. The arrangement of claim 28, said housing being of one piece with said cover and having an open upper end, and said flow passage being located in a peripheral wall of said housing; and wherein said housing comprises a removable cap for normally closing said upper open end thereof.

30. The arrangement of claim 28, wherein said cover is provided with a throttling opening in said housing.

31. The arrangement of claim 20, wherein said first and second conduits have respective first and second outlet openings at said metering device and said first and second valve members are located adjacent to said first and second outlet openings, respectively.

* * * * *